(12) United States Patent
Mayer et al.

(10) Patent No.: US 7,581,398 B2
(45) Date of Patent: Sep. 1, 2009

(54) PURGED FLAMEHOLDER FUEL SHIELD

(75) Inventors: Jeffrey Carl Mayer, Swampscott, MA (US); Brian Benscoter Roberts, Malden, MA (US)

(73) Assignee: General Electric Company, Schenectady, NY (US)

( * ) Notice: Subject to any disclaimer, the term of this patent is extended or adjusted under 35 U.S.C. 154(b) by 486 days.

(21) Appl. No.: 11/478,246

(22) Filed: Jun. 29, 2006

(65) Prior Publication Data

US 2009/0113894 A1    May 7, 2009

(51) Int. Cl.
   *F02K 3/105* (2006.01)
(52) U.S. Cl. .................. 60/762; 60/761; 60/765
(58) Field of Classification Search ............ 60/761–766
   See application file for complete search history.

(56) References Cited

U.S. PATENT DOCUMENTS

| | | | |
|---|---|---|---|
| 2,693,083 A | 11/1954 | Abbott | |
| 2,780,061 A | 2/1957 | Clarke et al. | |
| 2,780,916 A | 2/1957 | Collins | |
| 2,799,991 A * | 7/1957 | Conrad | 60/749 |
| 2,861,424 A | 11/1958 | Jurisch | |
| 2,872,785 A | 2/1959 | Barrett et al. | |
| 2,920,445 A | 1/1960 | Bailey | |
| 3,054,259 A | 9/1962 | Arthur et al. | |
| 3,176,465 A | 4/1965 | Colley | |
| 3,765,178 A * | 10/1973 | Hufnagel et al. | 60/765 |
| 3,800,527 A | 4/1974 | Marshall et al. | |
| 4,064,691 A | 12/1977 | Nash | |
| 4,312,185 A | 1/1982 | Nash et al. | |
| 4,445,339 A | 5/1984 | Davis et al. | |
| 4,490,973 A | 1/1985 | Kinsey | |
| 4,813,229 A | 3/1989 | Simmons | |
| 4,887,425 A | 12/1989 | Vdoviak | |
| 4,989,407 A | 2/1991 | Grant | |
| 5,001,898 A | 3/1991 | Holladay | |
| 5,020,318 A | 6/1991 | Vdoviak | |
| 5,076,062 A | 12/1991 | Abreu | |
| 5,142,858 A | 9/1992 | Ciokajlo et al. | |
| 5,396,763 A * | 3/1995 | Mayer et al. | 60/765 |
| 5,813,221 A | 9/1998 | Geiser et al. | |
| 6,112,516 A * | 9/2000 | Beule et al. | 60/765 |

OTHER PUBLICATIONS

M.W. Frash et al, U.S. Appl. No. 11/478,229, filed Jun. 29, 2006, entitled "Flameholder Fuel Shield,".

* cited by examiner

*Primary Examiner*—Michael Cuff
*Assistant Examiner*—Phutthiwat Wongwian
(74) *Attorney, Agent, or Firm*—William S. Andes; Francis L. Conte

(57) ABSTRACT

A fuel shield is configured for use in the afterburner of a turbofan aircraft engine. The shield includes wings obliquely joined together at a nose to conform with the leading edge region of a flameholder vane. A hood is joined to the wings and extends obliquely therefrom to conform with a supporting outer shell of the flameholder.

22 Claims, 7 Drawing Sheets

PURGED FLAMEHOLDER FUEL SHIELD

The U.S. Government may have certain rights in this invention in accordance with Contract No. N00019-03-D-003 awarded by the Department of the Navy.

BACKGROUND OF THE INVENTION

The present invention relates generally to gas turbine engines, and, more specifically, to augmented turbofan engines.

The typical turbofan gas turbine aircraft engine includes in serial flow communication a fan, compressor, combustor, high pressure turbine (HPT), and low pressure turbine (LPT). Inlet air is pressurized through the fan and compressor and mixed with fuel in the combustor for generating hot combustion gases.

The HPT extracts energy from the combustion gases to power the compressor through a corresponding drive shaft extending therebetween. The LPT extracts additional energy from the combustion gases to power the fan through another drive shaft extending therebetween.

In the turbofan engine, a majority of the pressurized fan air bypasses the core engine through a surrounding annular bypass duct and rejoins the core exhaust flow at the aft end of the engine for collectively providing the propulsion thrust for powering an aircraft in flight.

Additional propulsion thrust may be provided in the engine by incorporating an augmentor or afterburner at the aft end of the engine. The typical afterburner includes a flameholder and cooperating fuel spraybars which introduce additional fuel in the exhaust discharged from the turbofan engine. The additional fuel is burned within an afterburner liner for increasing the propulsion thrust of the engine for limited duration when desired.

A variable area exhaust nozzle (VEN) is mounted at the aft end of the afterburner and includes movable exhaust flaps. The flaps define a converging-diverging (CD) nozzle which optimizes performance of the engine during non-augmented, dry operation of the engine at normal thrust level, and during augmented, wet operation of the engine when additional fuel is burned in the afterburner for temporarily increasing the propulsion thrust from the engine.

Flameholders have various designs and are suitably configured to hold or maintain fixed the flame front in the afterburner. The exhaust flow from the turbofan engine itself has relatively high velocity, and the flameholder provides a bluff body to create a relatively low velocity region in which the afterburner flame may be initiated and maintained during operation.

One embodiment of the flameholder that has been successfully used for many years in military aircraft around the world includes an annular flameholder having a row of flameholder or swirl vanes mounted between radially outer and inner shells. Each of the vanes has opposite pressure and suction sidewalls extending axially between opposite leading and trailing edges.

The aft end of each vane includes a generally flat aft panel facing in the aft downstream direction which collectively provide around the circumference of the flameholder a protected, bluff body area effective for holding the downstream flame during augmentor operation. In one embodiment, the aft panel includes a series of radial cooling slots fed with a portion of un-carbureted exhaust flow received inside each of the vanes for providing cooling thereof during operation.

Since the flameholders are disposed at the aft end of the turbofan engine and are bathed in the hot exhaust flow therefrom they have a limited useful life due to that hostile thermal environment. Furthermore, when the afterburner is operated to produce additional combustion gases aft therefrom further heat is generated thereby, and also affects the useful life of the afterburner, including in particular the flameholder itself.

An additional problem has been uncovered during use of this exemplary engine due to the introduction of fuel into the flameholder assembly. This exemplary afterburner includes a row of main fuel spraybars and a fewer number of pilot fuel spraybars dispersed circumferentially therebetween. For example, each vane may be associated with two main spraybars straddling the leading edge thereof, and every other vane may include a pilot spraybar before the leading edge thereof.

The pilot spraybars are used to introduce limited fuel during the initial ignition of the afterburner followed by more fuel injected from the main spraybars. The pilot fuel is injected against the leading edges of the corresponding pilot vanes and spreads laterally along the opposite sidewalls of the vanes prior to ignition thereof.

Experience in operating engines has shown that the relatively cold pilot fuel creates thermal distress in the pilot vanes during operation, and limits the useful life thereof. All the flameholder vanes, including the pilot vanes, operate at relatively high temperature especially during afterburner operation, and the introduction of the pilot fuel introduces corresponding temperature gradients in the pilot vanes which increase thermal stress therein.

Accordingly, the cyclical operation of the afterburner leads to greater thermal distress in the pilot vanes than the other, non-pilot vanes and can eventually induce thermal cracking in the leading edge region of the pilot vanes. These cracks then permit ingestion of pilot fuel inside the pilot vane and undesirable combustion therein which then leads to further thermal distress, spallation, and life-limited damage to the aft panels of the pilot vanes.

It is therefore desired to provide an improved afterburner flameholder for increasing the useful life thereof.

BRIEF DESCRIPTION OF THE INVENTION

A fuel shield is configured for use in the afterburner of a turbofan aircraft engine. The shield includes wings obliquely joined together at a nose to conform with the leading edge region of a flameholder vane. A hood is joined to the wings and extends obliquely therefrom to conform with a supporting outer shell of the flameholder.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
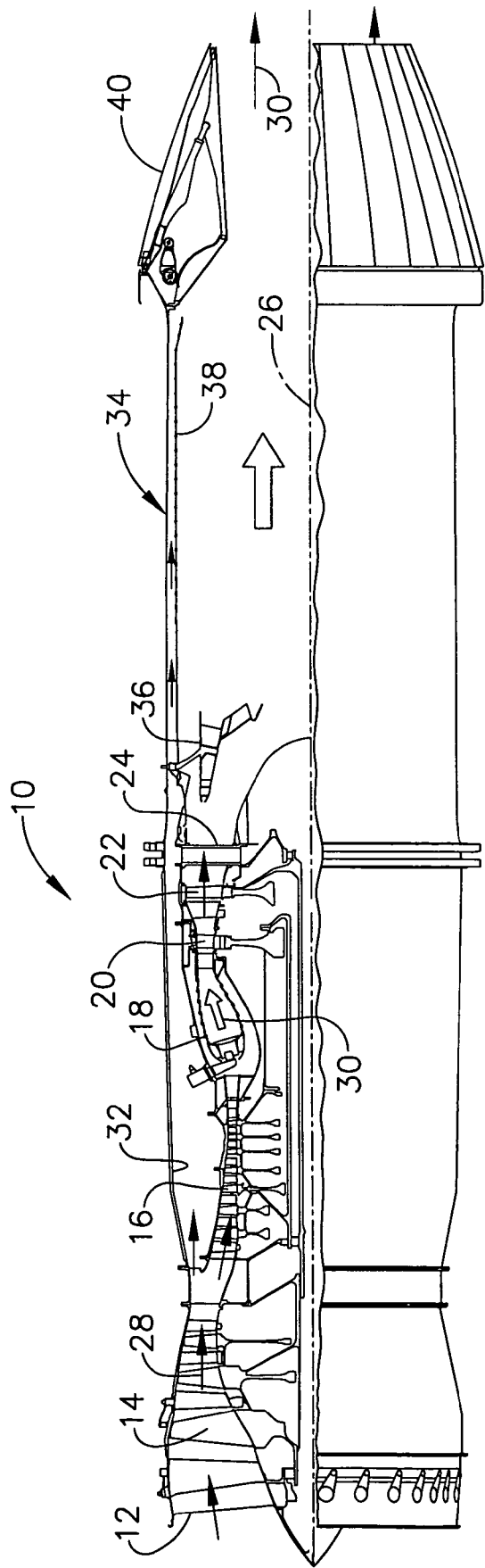
FIG. 1 is an axial sectional schematic view of exemplary turbofan aircraft gas turbine engine having an afterburner.

Illustrated schematically in FIG. 1 is an aircraft turbofan gas turbine engine 10 configured for powering an aircraft in flight. The engine includes in serial flow communication a row of variable inlet guide vanes (IGVs) 12, multistage fan 14, multistage axial compressor 16, combustor 18, single stage high pressure turbine (HPT) 20, single stage low pressure turbine (LPT) 22, and a rear frame 24 all coaxially disposed along the longitudinal or axial centerline axis 26.

During operation, air 28 enters the engine through the IGVs 12 and is pressurized in turn through the fan 14 and compressor 16. Fuel is injected into the pressurized air in the combustor 18 and ignited for generating hot combustion gases 30.

Energy is extracted from the gases in the HPT 20 for powering the compressor 16 through a drive shaft extending therebetween. Additional energy is extracted from the gases in the LPT 22 for powering the fan 14 through another drive shaft extending therebetween.

An annular bypass duct 32 surrounds the core engine and bypasses a portion of the pressurized fan air from entering the compressor. The bypass air joins the combustion gases downstream of the LPT which are collectively discharged from the engine for producing propulsion thrust during operation.

The turbofan engine illustrated in FIG. 1 also includes an augmentor or afterburner 34 at the aft end thereof. The afterburner includes an annular flameholder assembly 36 at the upstream end thereof, and an annular afterburner liner 38 extends downstream therefrom. Additional fuel is suitably injected into the flameholder during operation for mixing with the exhaust flow from the turbofan engine and producing additional combustion gases contained within the flameholder liner 38.

A variable area exhaust nozzle (VEN) 40 is disposed at the aft end of the afterburner and includes a row of movable exhaust flaps which are positionable to form a converging-diverging (CD) exhaust nozzle for optimizing performance of the engine during both dry, non-augmented operation and wet, augmented operation of the engine.

The basic engine illustrated in FIG. 1 is conventional in configuration and operation, and as indicated above in the Background section has experienced many years of successful use throughout the world. The annular flameholder 36 thereof is also conventional in this engine and is modified as described hereinbelow for improved durability thereof.

Figure 2:
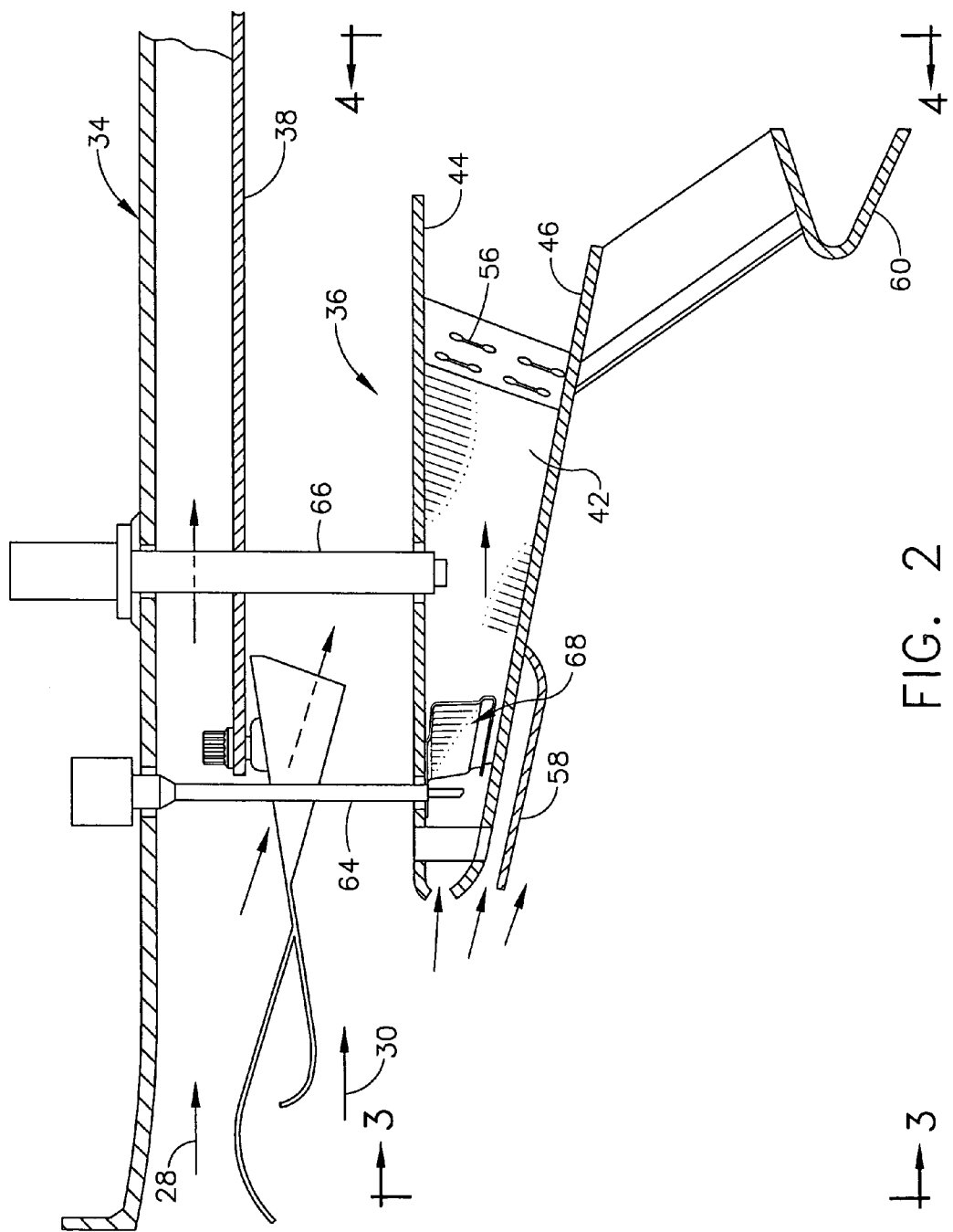
FIG. 2 is an enlarged axial sectional view of a portion of the annular flameholder assembly in the afterburner illustrated in FIG. 1.
Figure 3:
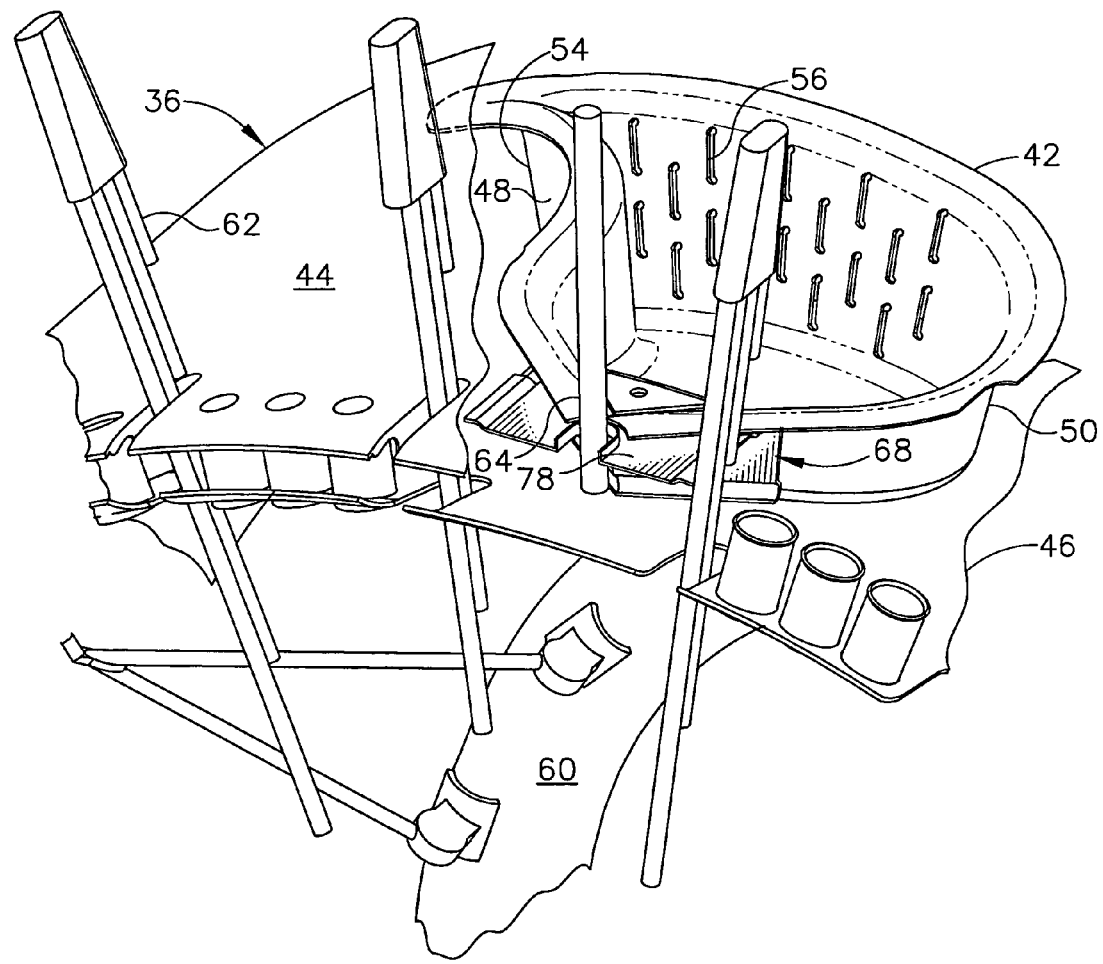
FIG. 3 is a forward-facing-aft isometric view of a portion of the flameholder illustrated in FIG. 2 and taken along line 3-3.
Figure 4:
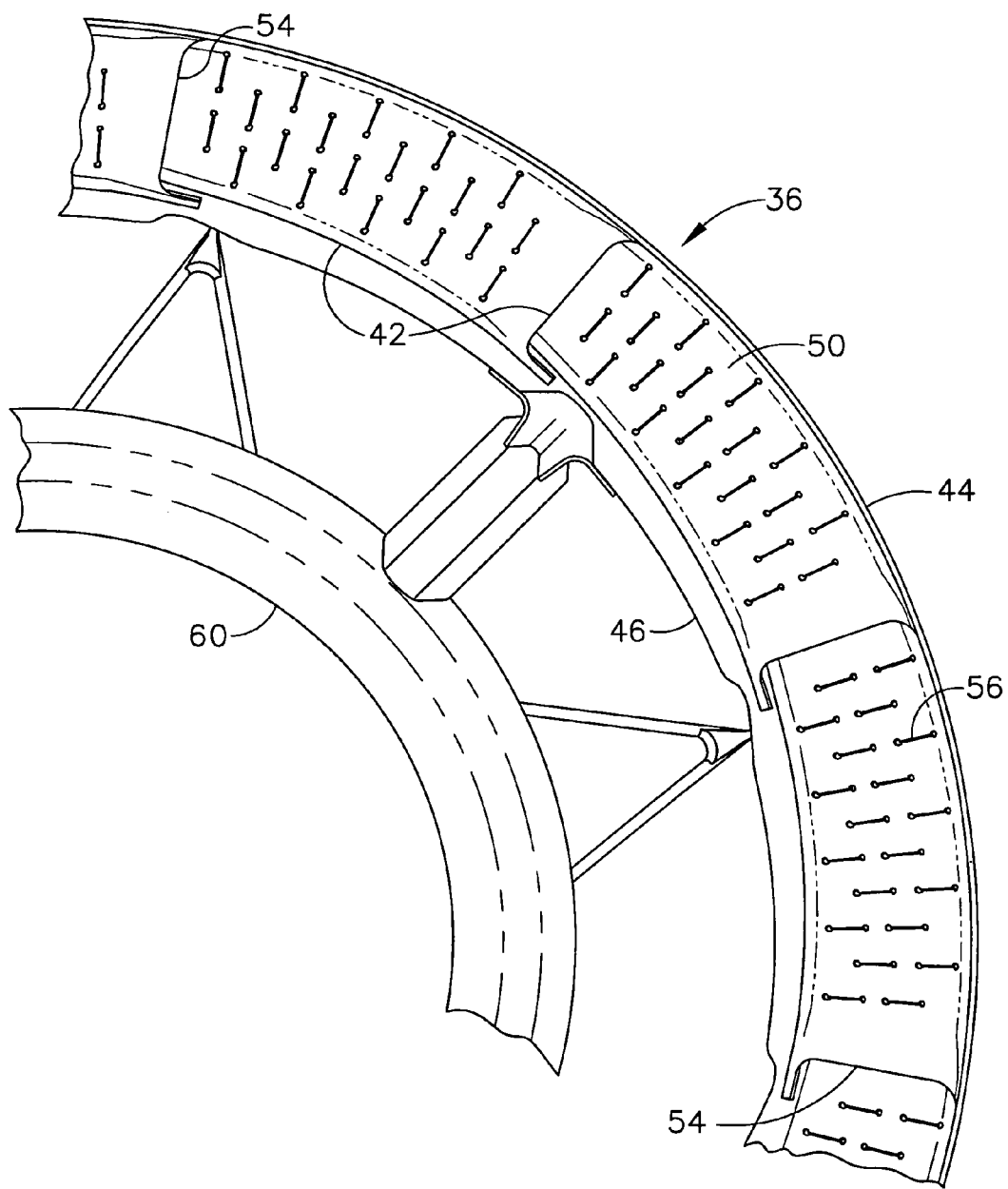
FIG. 4 is a aft-facing-forward view of a portion of the flameholder illustrated in FIG. 2 and taken along line 4-4.

The upstream portion of the afterburner 34 is illustrated in more detail in FIG. 2, with FIGS. 3 and 4 illustrating forward and aft views of the exemplary annular flameholder assembly 36 thereof.

The flameholder assembly includes a row of flameholder or swirl vanes or partitions 42 fixedly joined, by brazing for example, to radially outer and inner shells 44,46. Each of the vanes 42 is hollow, as best illustrated in FIG. 3, and includes a first or pressure sidewall 48 and a circumferentially opposite second or suction sidewall 50 extending axially between opposite leading and trailing edges 52,54.

Figure 5:
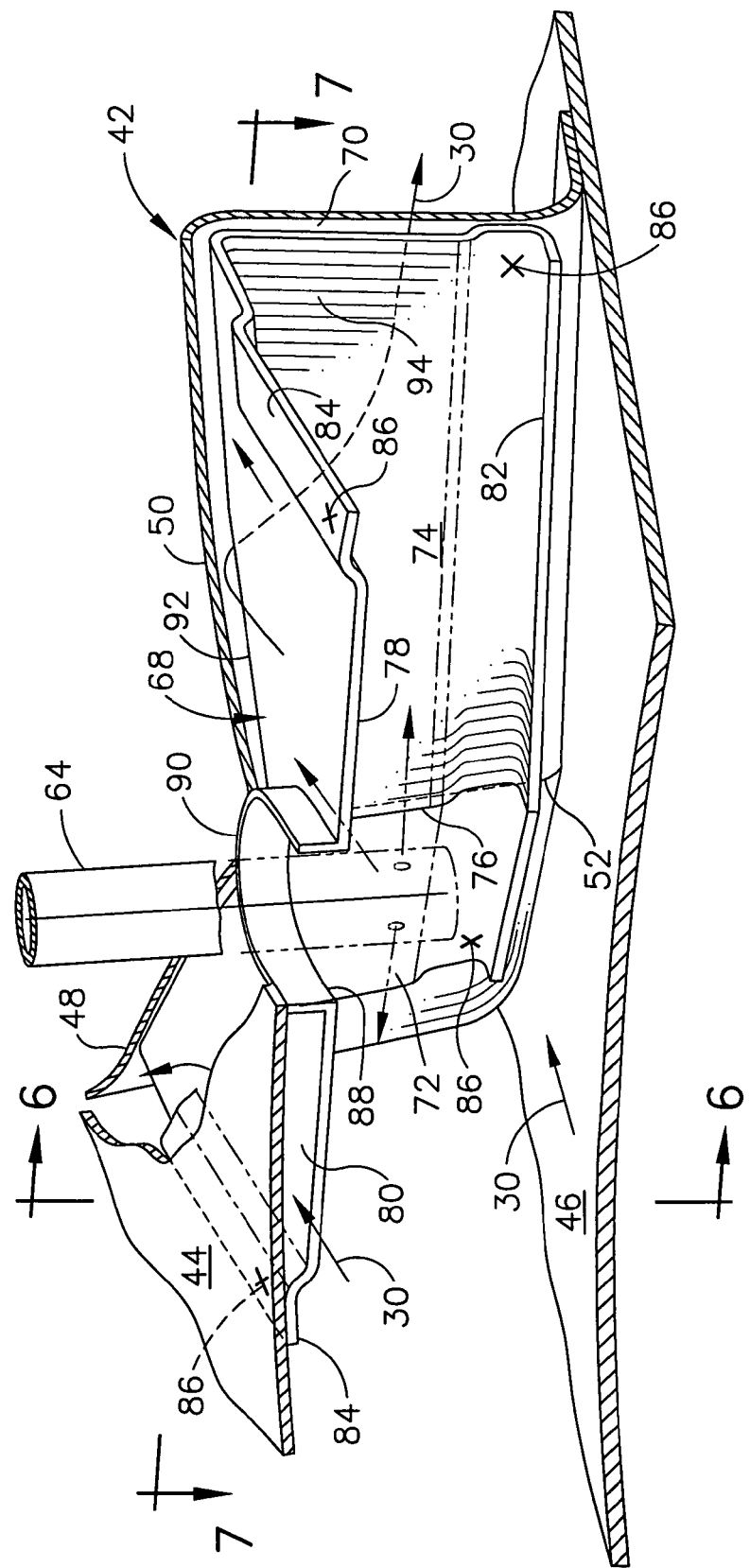
FIG. 5 is an enlarged, isometric view of an exemplary fuel shield cooperating with the pilot flameholder vanes illustrated in FIGS. 2 and 3.

The two sidewalls 48,50 as best illustrated in FIGS. 3 and 5 are generally flat and symmetrical where they join together at the leading edge 52 at an included angle of about 90 degrees. The first sidewall 48 is generally concave aft therefrom and is imperforate between the leading and trailing edges.

The second sidewall 50 is generally convex and is imperforate from the leading edge aft to about the maximum width of the vane. The second sidewall includes a generally flat aft panel that forms circumferentially with the adjoining vanes a substantially flat annular bluff body having flameholder capability as illustrated in part in FIG. 4.

The aft panels include a pattern of radial discharge slots 56 which are fed by an upstream scoop 58 shown in FIG. 2 that receives a portion of the un-carbureted exhaust flow from the turbofan engine. Exhaust flow is channeled through the scoop 58 and an inlet aperture in the inner shell 46 to feed the inside of each of the vanes with the exhaust flow. This internal exhaust flow cools the vanes during operation, and is discharged through the exit slots 56 in the aft panels for providing thermal insulation against the hot combustion gases generated downstream in the afterburner during operation.

The row of vanes 42 thusly defines an outer flameholder, and a cooperating annular inner flameholder 60 is mounted concentrically therein by a plurality of supporting links or bars shown in FIGS. 3 and 4. And, a radial crossover gutter extends between the aft end of the inner shell 46 and the inner flameholder 60 as illustrated in FIGS. 2 and 4 to maintain ignition flow communication therebetween.

As shown in FIG. 3, a plurality of main fuel injectors or spraybars 62 are distributed circumferentially in a row before the row of flameholder vanes 42. For example, two main spraybars 62 are provided for each of the vanes 42 and straddle each vane on circumferentially opposite sides of the leading edge 52.

A smaller plurality of pilot fuel injectors or spraybars 64 are positioned before the corresponding leading edges 52 in a one-to-one correspondence with corresponding ones of the flameholder vanes, also referred to as pilot vanes 42. For example, a pilot spraybar 64 may be located before the leading edge of every other vane 42 and therefore have a total number which is half that of the total number of vanes 42.

As shown in FIGS. 2 and 3, the outer and inner shells 44,46 extend both upstream from the leading edges of the vanes 42 and downstream from the trailing edges thereof and diverge radially in the downstream aft direction therebetween. The leading edges of the two shells form an annular inlet through which a portion of the engine exhaust 30 is received during operation.

The two shells are jointed together along their leading edges by a row of radially extending tubes. And, the shells have a series of U-shaped slots along the leading edges thereof which receive respective ones of the main and pilot spraybars when assembled.

As shown in FIGS. 3 and 5, the vanes 42 are spaced apart circumferentially and define therebetween flow passages in which the injected fuel mixes with the exhaust flow for providing the fuel and air mixture that is ignited in the afterburner during operation. The inter-vane flow passages initially converge in the axial downstream direction and then may diverge from the maximum width of the vanes to their trailing edges in accordance with conventional practice.

The resulting configuration of the vane passages is therefore a relatively complex 3-D cooperation of the vanes and shells.

During operation, fuel is suitably channeled through the pilot spraybars 64 and injected in front of the pilot vanes where it mixes with exhaust flow from the turbofan engine and is suitably ignited by an electrical igniter 66 illustrated in FIG. 2 for initiating the afterburner combustion flame. Additional fuel is injected through the main spraybars 62 at different radial locations within the flameholder assembly and adds to the combustion flame which is held by the outer flameholder defined by the vanes 42 and the inner flameholder 60 having the form of an annular V-gutter facing in the downstream direction.

The afterburner 34 and the basic flameholder assembly 36 described above are conventional in configuration and operation and are found in the exemplary turbofan engine described above in the Background which has experienced many years of successful commercial use throughout the world.

However, the pilot spraybars 64 described above inject relatively cold fuel against the leading edge 52 of the pilot vanes 42 during operation which leads to substantial gradients in temperature of the pilot vanes. This temperature gradient then leads to thermal distress over many cycles of operation of the engine. The pilot vanes are thusly limited in life by thermally induced cracks in the leading edge regions thereof through which pilot fuel may enter, ignite, and heat the vanes from inside leading to premature failure of the aft panels.

Accordingly, the conventional flameholder described above is modified as described hereinbelow for protecting the pilot vanes 42 against the cold quenching affect of the injected pilot fuel for substantially increasing the useful life of the flameholder assembly well beyond that of the conventional flameholder.

The problem of fuel quenching of the leading edge regions of the pilot vanes 42 is solved by introducing a plurality of identical fuel shields 68 disposed in front of corresponding ones of the pilot vanes 42 behind the corresponding pilot spraybars 64. Each fuel shield is configured to aerodynamically match or complement the leading edge region of each pilot vane and suitably covers this region to prevent direct impingement of the injected fuel thereagainst.

The fuel shields 68 are shown in several views in FIGS. 2, 3 and 5 and are introduced solely at the pilot vanes 42 corresponding with the pilot spraybars, and not on the remainder of flameholder vanes which are not subject to fuel quenching along their leading edges.

Figure 6:
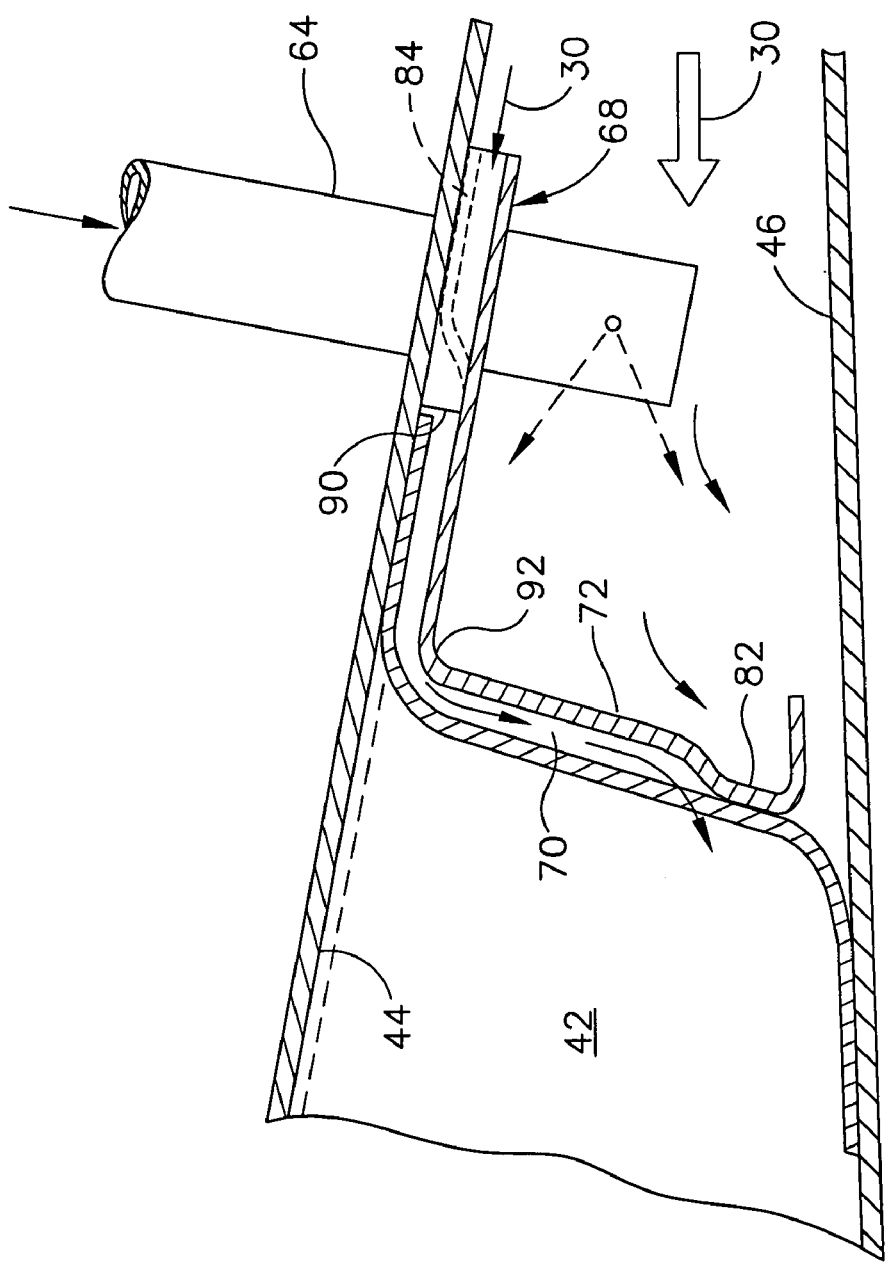
FIG. 6 is a radial sectional view through the fuel shield and pilot vane illustrated in FIG. 5 and taken along line 6-6.
Figure 7:
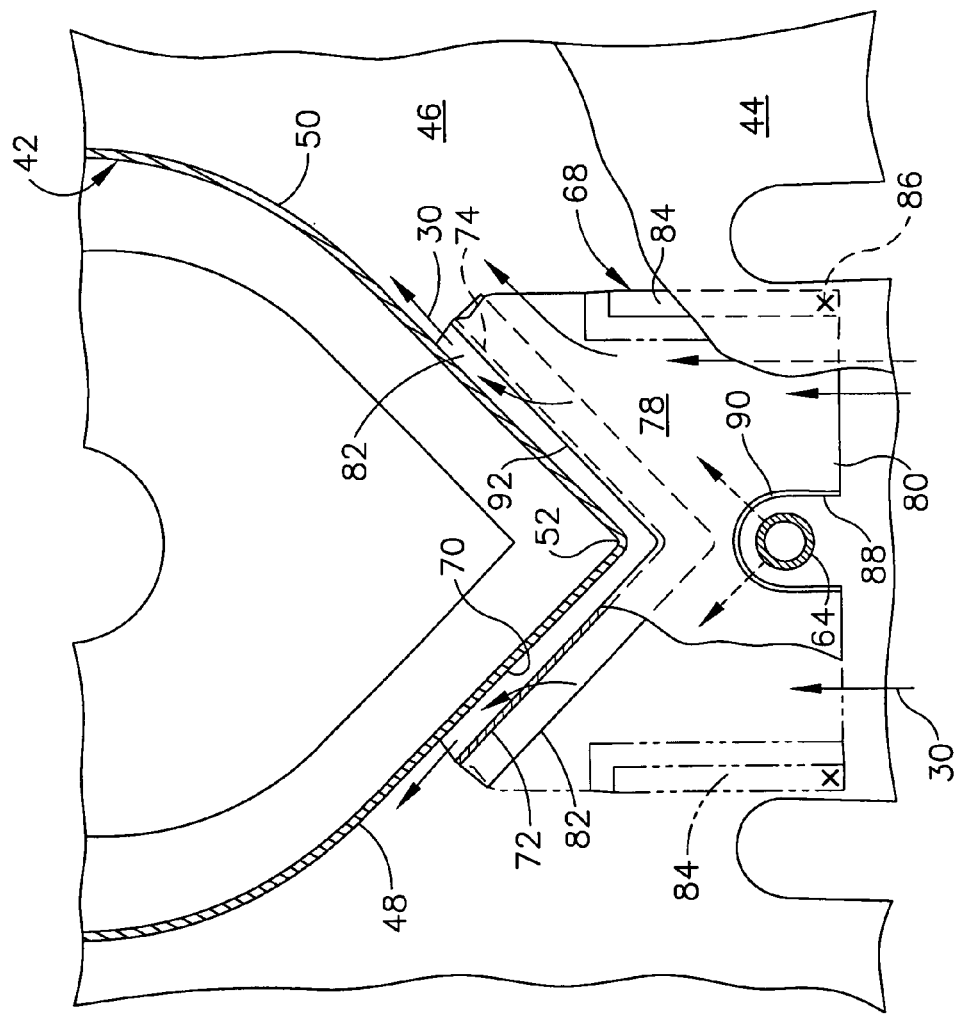
FIG. 7 is a circumferential sectional view through the fuel shield and pilot vane illustrated in FIG. 5 and taken along line 7-7.

FIG. 5 shows an enlarged isometric view of one of the fuel shields 68 bridging the leading edge of the pilot vane 42, and FIGS. 6 and 7 illustrate corresponding radial and circumferential sectional views thereof. These three figures illustrate the aerodynamic configuration of the fuel shields 68 conforming with the 3-D configuration of the leading edge region of the pilot vanes 42 between the outer and inner and shells 44,46.

The shields are suitably mounted to the vane 42 between the two shells 44,46 to provide a thermally insulating aft space or gap 70 around the vane leading edge for protecting the leading edge from quenching by the cool pilot fuel when injected. In this way, the leading edge region of each vane behind the fuel shield is then permitted to operate at a higher temperature than previously obtained under fuel quenching, which correspondingly reduces the thermal gradients in this region of the pilot vane, and in turn substantially reduces thermal distress. Accordingly, the useful life of the flameholder assembly may be increased significantly.

The fuel shield illustrated in FIG. 5 includes a pair of first and second imperforate thin plates or wings 72,74 which are integrally joined together obliquely at a common apex or nose 76 that defines the unsupported or cantilevered forward distal ends thereof.

As shown in FIG. 5, a circumferentially extending outer sleeve or hood 78 is integrally joined to the common radially outer or lateral edges of the two wings 72,74 preferably along the full circumferential length thereof. The common hood 78 extends axially forwardly in the upstream direction obliquely from the two wings and generally perpendicularly thereto.

The hood 78 is spaced at least in part radially inwardly from the outer shell 44 to form a corresponding forward space or gap 80 therebetween disposed in flow communication with the aft gap 70.

As illustrated in FIGS. 5-7, the two wings 72,74 of the heat shield are configured to complement the pilot vane 42 around the leading edge region thereof, while the hood 78 is configured to complement its junction with the outer shell 44. In this way, the forward and aft gaps 80,70 provide a substantially continuous space circumferentially over the length of the fuel shield, axially over the hood, and radially behind the two wings for shielding and protecting the pilot vane from the adverse affects of the pilot fuel injected from the pilot spraybars during operation.

The flameholder vanes 42 themselves are made of suitable heat resistant metal for use in the hostile environment of the afterburner, and correspondingly the fuel shields 68 may be made of similar or different heat resistant metal. For example, the fuel shields may be formed from a nickel based superalloy such as Inconel™ 625 which is commercially available for use in gas turbine engines.

The two wings 72,74 shown in FIGS. 5 and 6 also include a common radially inner gutter 82 which extends along the full circumferential length of the opposite radially inner lateral edges of the two wings and bridging the common nose 76 thereof. The inner gutter 82 provides a local, circumferentially extending channel with a generally U-shaped radial cross section that provides several advantages in the fuel shield. The gutter 82 is bent or offset aft from the two wings to form the aft gap 70 between the vane sidewalls and the wings as the gutter contacts or abuts the sidewalls upon assembly.

Correspondingly, the hood 78 preferably includes a pair of integral lands or tabs 84 at opposite circumferential ends thereof corresponding with the opposite ends of each of the two wings 72,74. Each of the two tabs 84 is offset radially outwardly in thickness of the hood toward the outer shell to form the forward gap 80 over most of the surface area of the hood where it underlies the outer shell.

The two wings 72,74 are preferably formed of substantially flat and thin sheet metal which can be readily bent and fabricated to the desired shape including the integral gutters 82 therein. Correspondingly, the common hood 78 may also be formed of substantially flat and thin sheet metal and may remain flat between the two end tabs 84, or may be suitably arcuate to conform with the arcuate configuration of the surrounding outer shell. The two end tabs 84 may be readily bent or fabricated into the sheet metal construction of the hood 78.

FIGS. 5-7 illustrate the corresponding flowpath thusly created behind the fuel shield when it is suitably mounted in front of the pilot vane 42. The nose 76 of the shield is aligned with the vane leading edge 52, and the two wings 72,74 diverge laterally along the corresponding first and second sidewalls 48,50 of the vane.

The common hood 78 extends axially upstream below the outer shell to form the forward gap 80 therebetween which provides an upstream inlet that receives a portion of the exhaust flow 30 from the turbofan engine. The exhaust flow 30 is thusly channeled downstream through the forward gap 80 and then continues radially inwardly into the aft gap 70 between the wings and pilot vane. The exhaust flow 30 thusly continuously purges the backside of the fuel shield between the outer shell and pilot vane and increases the temperature of the leading edge region of the pilot vane.

The pilot spraybar 64 is mounted in front of the fuel shield, which shield thusly protects the leading edge region of each pilot vane from direct contact with the injected pilot fuel over the corresponding area thereof. The leading edge region of the pilot vane is thusly protected from quenching by the injected pilot fuel and will operate at a higher temperature without quenching thereof for thereby reducing the thermal gradients with the remainder of the pilot vane. Furthermore, the hot purge flow channeled between the wings and the pilot vane directly heats the pilot vane to further promote the reduction in temperature gradients therein during operation.

Since the pilot vane 42 initially diverges in the downstream direction on both sides of the leading edge 52, the corresponding fuel shields 68 similarly diverge to complement the 3-D configuration of the vane. As shown in FIG. 7, the two wings of the fuel shield are oblique with each other with an included angle therebetween of about 90 degrees, and conform generally with the corresponding configuration of the vane around its leading edge 52.

FIGS. 5-7 illustrate that the two tabs 84 preferably terminate in the hood 78 axially short of the corresponding wings 72,74 to continue the forward gap 80 axially between the aft ends of the two tabs and the junction of the hood with the two wings.

In this way, the inlet purge flow through the forward gap 80 is channeled initially axially aft over the hood and then flows both radially inwardly into the aft gap 70, as well as circumferentially outwardly over both wings behind the corresponding tabs 84.

Since the inner gutter 82 extends along the full circumferential length of the two wings and preferably abuts the corresponding sidewalls of the pilot vane, the purge flow behind the two wings is discharged therefrom circumferentially outwardly along the corresponding downstream or aft ends of the two wings.

The purge flow not only purges the aft gap 70 during operation, but heats the leading edge region of the pilot vane, and also provides a flow barrier when discharged from the shield to protect the downstream portions of the vane from the pilot fuel injected at the nose of the fuel shield.

The fuel shield 68 illustrated in FIG. 5 is preferably fixedly joined to the outer shell 44 at the two hood tabs 84 by corresponding welds or brazes 86, or both, as indicated schematically by the local X's. The fuel shield is also preferably fixedly joined to the two vane sidewalls 48,50 at the opposite circumferential ends of the inner gutter 82 by corresponding welds or brazes 86, or both as desired.

In this way, the thin, sheet metal wings and hood are fixedly joined at the corresponding four corners thereof to the outer shell and pilot vane to provide a rigid connection which also permits relatively unrestrained expansion and contraction of the fuel shield which is otherwise unrestrained along the majority of its inboard surface area.

The two brazes 86 at the opposite forward ends of the hood 78 securely mount the hood to the outer shell for withstanding the aerodynamic pressure forces of the incoming exhaust flow 30. Similarly, the two end brazes 86 at the opposite corners of the two wings maintain the inner gutter 82 in abutment with the vane sidewalls against the aerodynamic pressure forces of the purge flow being channeled through the aft gap 70.

FIGS. 5-7 also illustrate the location of the pilot spraybar 64 suitably upstream from the leading edge 52 of the pilot vane. The hood 78 extends suitably upstream from the two wings and pilot vane to prevent ingestion of the fuel into the space behind the fuel shield and in turn prevent combustion in this region.

Accordingly, the hood 78 preferably includes an access slot 88 disposed laterally in the circumferential middle or center between the opposite end tabs 84 for receiving the pilot spraybar and permitting the hood to extend axially upstream therefrom.

The hood 78 preferably also includes a radially outwardly extending barrier clip or fence 90 integrally joined by welding or brazing to the hood along the full perimeter of the access slot 88. The slot 88 is generally U-shaped with its open end facing in the upstream forward direction. The fence may be formed of sheet metal and extends obliquely or generally perpendicularly and radially outwardly from the outer surface of the hood.

The radial height of the fence 90 illustrated in FIGS. 5 and 6 corresponds with the radial height of the forward gap 80 and provides an effective flow barrier between the hood and corresponding slot in the outer shell 44 to prevent flow communication of the injected pilot fuel into the forward gap 80.

The central slot 88 and sealing fence 90 bifurcate the hood 78 circumferentially and thusly define two corresponding inlets into the common forward gap 80. The aft end of the slot 88 is spaced forwardly from the vane leading edge and closely adjacent to the pilot spraybar 64 disposed in the slot. In this way, the forward and aft gaps defined behind the fuel shield provide an independent flowpath for channeling the purge exhaust flow therethrough without opportunity for undesirable ingestion of the pilot fuel injected from the pilot spraybar during operation.

Both the hood and two wings correspondingly conform with the outer shell and pilot vane to maintain the aerodynamic configurations thereof and minimize any aerodynamic disturbance in the exhaust flow as it flows through the flameholder. Correspondingly, the fuel shield minimizes any disturbance in the operation of the pilot spraybar 64 which injects the pilot fuel along both sidewalls 48,50 of the pilot vane being protected by the two wings 72,74 of the fuel shield.

The inner gutter 82 illustrated in FIGS. 5 and 6 has a generally U-shaped cross section for offsetting the two wings from the vane sidewalls to maintain the depth of the corresponding aft gap 70, and preferably terminates in a radially inner, free edge or lip that extends forwardly in the axial upstream direction of the hood 78.

The inner gutter 82 is preferably spaced above the inner shell 46 as illustrated in FIG. 6 to provide a suitable spacing between the inner lip of the gutter and the inner shell 46 to provide additional advantage. Firstly, the so truncated inner gutter 82 only partly covers the junction of the inner bullnose of the pilot vane 42 with the inner shell 46 and permits visual inspection of the braze joint therebetween during the manufacturing process.

Furthermore, the so truncated inner gutter 82 also provides a suspended lip or edge along which the injected pilot fuel undergoes slinging or shearing when mixing with the high velocity incoming exhaust flow leading to enhanced vaporization thereof. In this way, the inner gutter 82 enhances mixing of the injected pilot fuel with the exhaust flow 30 while protecting the inner shell 46 therefrom.

During operation, both the incoming exhaust flow 30 and the injected pilot fuel flow downstream over the two wings 72,74, and the gutter lip promotes shedding or shearing of the injected fuel and its mixing with the incoming exhaust flow. The injected pilot fuel may therefore be promptly mixed and vaporized in the exhaust flow without adversely affecting the inner shell 46.

Correspondingly, the hood 78 protects the outer shell 44 from the injected pilot fuel. The hood 78 preferably joins the two wings 72,74 at a common arcuate bend or fillet 92 which is spaced from the junction of the vane and outer shell to provide unobstructed flow communication from the forward gap 80 around the backside of the fillet 92 to the aft gap 70. The entire fuel shield is therefore spaced over most of its surface area from the pilot vane and the outer shell by the inner gutter 82 at the radially inner end thereof and by the two end tabs 84 at the radially outer end thereof.

The resulting backside flowpath formed behind the fuel shield provides axial inlets in the forward gap 80 for receiving the purge flow 30 which is then smoothly guided both radially inwardly through the aft gap 70 as well as guided circumferentially or laterally outwardly from both aft ends of the two corresponding wings 74, as well as from the aft portions of the forward gap 80 provided directly behind the two tabs 84.

Accordingly, the thin, sheet metal configuration of the fuel shield 68 can be introduced in the flameholder with a minimal change in the 3-D configuration thereof, while maintaining the desired aerodynamic performance of the flameholder, while also protecting the pilot vanes from the injected pilot fuel, with corresponding purge flow efficiently provided behind the fuel shield.

The fuel shield illustrated in FIGS. 5 and 7 is preferably formed by metal fabrication from sheet metal, or could be formed by the more expensive process of casting if desired. In the preferred sheet metal construction, the first wing 72 and the corresponding half portion of the hood 78 may comprise a unitary piece of sheet metal suitably bent to shape to additionally include the corresponding inner gutter 82 and offset tab 84.

Similarly, the second wing 74 and corresponding opposite half portion of the hood 78 may comprise another unitary piece of sheet metal similarly bent to shape in a generally symmetrical or mirror-image counterpart of the corresponding half of the shield.

The two sheets or pieces may then be suitably joined together along the middle or centerline which defines the common nose 76, and along the two symmetrical halves of the slot 88. Welding or brazing may be used to join these two pieces together.

The fence 90 is preferably a third unitary piece which may be readily welded or brazed to the prejoined halves of the fuel shield in an integral three-piece assembly thereof.

As shown in FIG. 5, the exposed external surface of the fuel shield 68 may be suitably covered with a conventional ceramic-based thermal barrier coating (TBC) 94, which is also applied to the exposed surfaces of the flameholder vanes and shells in conventional practice.

Thermal barrier coatings are conventional in modern gas turbine engines. The TBC 94 is a thermally insulating ceramic material sprayed on metal components during the manufacturing process. The entire external surfaces of the flameholder vanes and fuel shields shown in FIG. 5 for example, are suitably covered with the TBC to enhance their useful life.

The fuel shield disclosed above in its simple sheet metal configuration may be readily and inexpensively manufactured and introduced into new or existing flameholders with little modification thereof and without adversely affecting aerodynamic performance thereof. And, the fuel shield protects the pilot vanes from the quenching affect of the injected pilot fuel for substantially reducing the thermal gradients in the pilot vanes and increasing their useful life.

Since the fuel shield itself is an independent component selectively mounted at the limited braze joints 86, it remains relatively thermally free and unrestrained and experiences limited thermal gradients therein for a correspondingly long useful life thereof.

Not only are the pilot vanes themselves protected from pilot fuel quenching, but the purge flowpath provided behind the fuel shield and the pilot vanes permits the exhaust flow to heat the pilot vanes themselves for reducing the thermal gradients therein, while also purging the shield-vane flow passage of any pilot fuel which may migrate therein.

The purge flow also heats the backside of the fuel shield itself which increases it minimum operating temperature and correspondingly reduces thermal gradients in the shield itself and the corresponding thermal stresses.

The pilot spraybar continues to operate in its intended manner with the incoming exhaust flow in front of each pilot vane. The fuel shield conforms with the original 3-D configuration of the flameholder in the vicinity of the pilot spraybar, and introduces the auxiliary purge flowpath behind the hood and cooperating two wings of the shield. The purge flow is discharged from the fuel shield between the outlet gaps at the opposite ends of the two wings and the aft end of the hood behind the two tabs 84 to promote mixing of the pilot fuel downstream therefrom. The inner gutter 82 provides an additional mechanism along which the injected pilot fuel may undergo shearing for enhanced mixing and vaporization in the exhaust flowstream.

The gutter lip enhances shedding and mixing of liquid pilot fuel to promote quicker mixing thereof with the exhaust flow for promoting combustion ignition and lightoff and combustion stability. And, the spaced inner gutter prevents pilot fuel from engaging the inner shell and prevents spontaneous combustion thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. An afterburner for a turbofan engine comprising:
    a row of flameholder vanes joined to radially outer and inner shells;
    each of said vanes including first and second sidewalls extending between leading and trailing edges;
    a plurality of main fuel spraybars distributed circumferentially before said vanes;
    a smaller plurality of pilot fuel spraybars positioned before leading edges of corresponding pilot vanes; and
    a plurality of fuel shields disposed between corresponding pilot vanes and said pilot spraybars, and covering said leading edges of said pilot vanes with a thermally insulating aft gap therebetween, and each fuel shield is spaced from said outer shell to form a forward gap therebetween disposed in flow communication with said aft gap.

2. An afterburner according to claim 1 wherein each of said fuel shields comprises:
    first and second wings obliquely joined together at a nose aligned with said vane leading edge;
    a hood integrally joined to a common radially outer edge of said wings and extending axially forwardly therefrom; and
    said wings being configured to complement said flameholder vane around said leading edge to effect said aft gap, and said hood being configured to complement said outer shell to effect said forward gap radially therebetween.

3. An afterburner according to claim 2 wherein said wings include a radially inner gutter extending along an opposite radially inner edge thereof and abutting said pilot vane, and offset aft from said wings to form said aft gap with said vane sidewalls.

4. An afterburner according to claim 3 wherein said hood includes a pair of tabs at opposite circumferential ends thereof corresponding with each of said wings, and each of said tabs is offset radially outwardly from said hood and abuts said outer shell to form said forward gap with said outer shell.

5. An afterburner according to claim 4 wherein said tabs terminate in said hood axially short of said wings to continue said forward gap axially therebetween.

6. An afterburner according to claim 5 wherein said hood further includes an access slot disposed laterally between said opposite tabs, and a corresponding pilot spraybar is disposed in said slot.

7. An afterburner according to claim 6 wherein said hood further includes a fence integrally joined thereto along said access slot and extending radially outwardly therefrom to join said outer shell.

8. An afterburner according to claim 7 wherein said inner gutter terminates in a lip extending forwardly with said hood.

9. An afterburner according to claim 8 wherein said hood joins said wings at a common fillet therebetween to provide flow communication from said forward gap, around said fillet, to said aft gap.

10. An afterburner according to claim 9 wherein said first wing and corresponding portion of said hood comprises a unitary piece of sheet metal, and said second wing and corresponding portion of said hood comprise another uniform piece of sheet metal, and said two sheets are joined together along the middle of said fuel shield.

11. For a turbofan engine having an afterburner with a row of flameholder vanes mounted to radially outer and inner annular shells, and each vane including first and second sidewalls jointed together at opposite leading and trailing edges, a fuel shield comprising: first and second wings obliquely jointed together at a nose; a hood integrally joined to a common edge of said wings and extending obliquely therefrom; and said wings being configured to complement said flameholder vane around said leading edge, and said hood being configured to complement said outer shell.

12. For a turbofan engine having an afterburner with a row of flameholder vanes mounted between radially outer and inner shells, and each vane including first and second sidewalls extending between leading and trailing edges, a fuel shield comprising:
first and second wings obliquely joined together at a nose, and including an inner gutter extending along an opposite edge thereof and offset from said wings to form an aft gap with said vane sidewalls;
a hood integrally joined to a common edge of said wings and extending obliquely therefrom; and
said wings being configured to complement said flameholder vane around said leading edge, and said hood being configured to complement said outer shell.

13. A shield according to claim 12 wherein said hood includes a pair of tabs at opposite ends thereof corresponding with each of said wings, and each of said tabs is offset from said hood to form a forward gap between said hood and outer shell.

14. A shield according to claim 13 wherein said tabs terminate in said hood short of said wings to continue said forward gap therebetween.

15. A shield according to claim 13 wherein said hood further includes an access slot disposed laterally between said opposite tabs.

16. A shield according to claim 15 wherein said hood further includes a fence integrally joined thereto along said access slot and extending obliquely therefrom.

17. A shield according to claim 13 wherein said inner gutter terminates in a lip extending forwardly with said hood.

18. A shield according to claim 13 wherein said hood joins said wings at a common fillet therebetween to provide flow communication from said forward gap, around said fillet, to said aft gap.

19. A shield according to claim 13 wherein said wings, comprise substantially flat sheet metal.

20. A shield according to claim 13 in combination with said afterburner, and wherein fewer than all said vanes include a pilot fuel spraybar disposed in front of said vane leading edge, and said wings are mounted between said leading edge and pilot spraybar, and said hood is mounted to said outer shell.

21. An apparatus according to claim 20 wherein said inner gutter is spaced above said inner shell.

22. An apparatus according to claim 21 wherein said fuel shield is fixedly joined to said outer shell at said two hood tabs, and fixedly joined to said two vane sidewalls at opposite ends of said inner gutter.

* * * * *